Patented Apr. 6, 1926.

1,580,080

UNITED STATES PATENT OFFICE.

ERICH VOGT AND LUDWIG KIRCHHOF, OF BERGISCH-GLADBACH, GERMANY.

FURNACE FIRED WITH COAL DUST AND LIKE PULVERULENT FUEL.

Application filed January 26, 1926. Serial No. 83,933.

*To all whom it may concern:*

Be it known that we, ERICH VOGT and LUDWIG KIRCHHOF, citizens of the German Republic, both residing at Bergisch-Gladbach, Germany, have invented certain new and useful Improvements in or Relating to Furnaces Fired with Coal Dust and like Pulverulent Fuel, of which the following is a specification.

The invention relates to furnaces fired with coal dust and like pulverulent fuel, such for example, as heating furnaces, welding furnaces, rolling mill furnaces, rotary kilns, or the like, of the type having a horizontal or approximately horizontal space for the reception of the material to be heated, and a vertical combustion chamber into which the mixture of fuel dust and air is supplied in a downward direction from the top cover.

According to the present invention in such furnaces the vertical combustion chamber is completely open to the space containing the material to be heated, while the fuel is completely burnt in the combustion chamber. In this way the heat produced in the chamber radiates without loss into the heating space thus heating the material therein satisfactorily by radiation. In the vertical combustion chambers used hitherto, there was either no opening at all or only a very narrow one, so that the heat radiated by the flame reached the wall of the chamber and was reflected back to the opposite wall through the flame. This radiant heat rapidly damaged the walls, whereas with the present invention, the radiant heat on the treatment chamber side passes straight out and that which is radiated to the opposite closed side is reflected back through the flame directly into the treatment chamber. In this way the effect of radiated heat on the walls is greatly reduced and the walls last much longer thus lowering the expense of upkeep. The material under treatment is of course not blackened by the radiated heat while the furnace gases passing into the heating space will not appreciably blacken the said material for the reason that the flame is completely burnt out in the combustion chamber and the solid or fluid particles fall on to the bottom of the chamber when the flame changes its direction and turns to the heating space of the furnace. The solid or fluid particles gathering on the bottom of the chamber can be easily removed therefrom in some well known manner.

To ensure the complete combustion of the dust fuel in the combustion chamber, the secondary air supplied to the mixture of fuel dust and primary air is preheated in the known way by contact with the walls of the combustion chamber. In this way the walls of the combustion chamber are cooled at the same time. The complete combustion in the combustion chamber makes it desirable, in spite of the considerable reduction of the action of the radiated heat, to use a large quantity of cool air. The quantity of cool air employed is too great for use as the secondary air supply and the excess of air is therefore diverted before entering the burner by adjustable means to allow of the supply of secondary air being adjusted to suit any particular object or circumstances.

In the accompanying drawings, a constructional example of such a furnace is shown.

Figure 1:
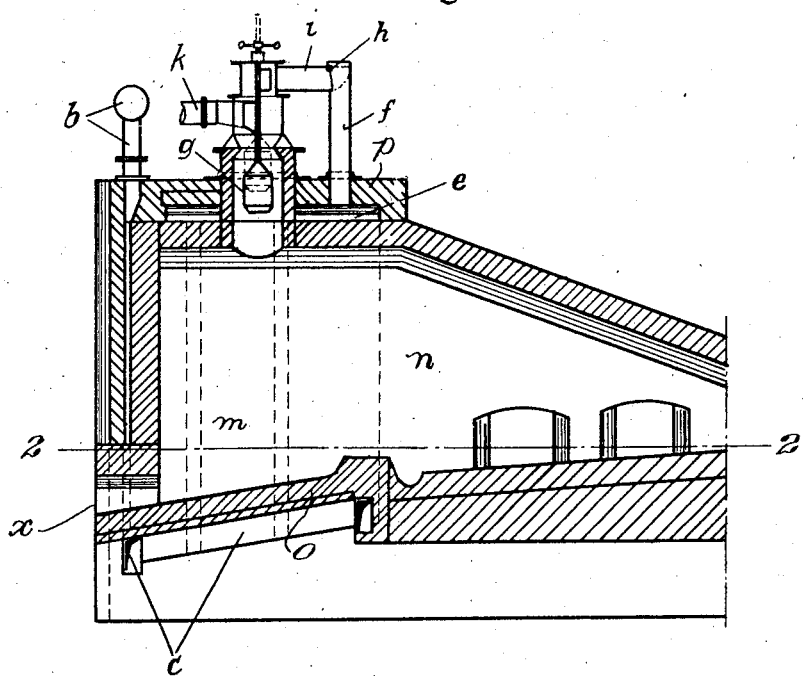
Figure 1 is a vertical section of the furnace.
Figure 2:
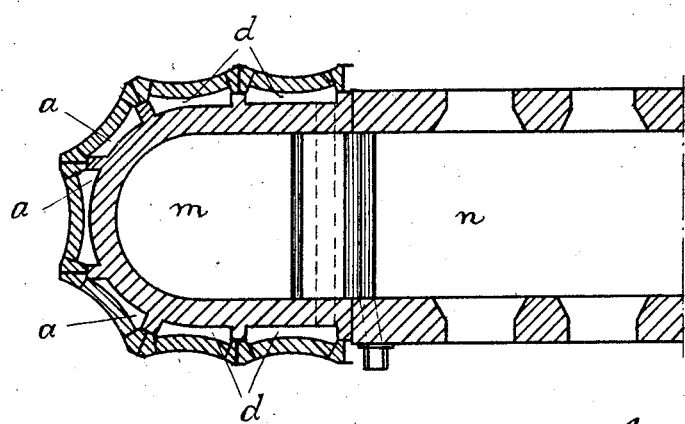
Figure 2 is a horizontal section through the line 2—2 of Figure 1.

$k$ is the pipe for the primary supply of air into the top of the combustion chamber with the powdered fuel.

$m$ indicates the inside of the combustion chamber which is completely open to the space $n$ for the reception of the material to be treated. In the walls of the combustion chamber vertical channels $a$ are formed which channels are connected to the pressure air conduit $b$. The air passes through these channels $a$ into channels $c$ underneath the bottom $o$ of the combustion chamber and from thence through the vertical channels $d$, into a collector space $e$ in the cover $p$ of the combustion chamber from whence they are led through the pipes $f$ and $i$ to the burner. A regulating valve $h$ is fitted at the point where the pipe $f$, which is open at the top, leads into the pipe $i$. According to the setting of this valve $h$, the air which has been heated in the channels $a$ and $d$ and has cooled the walls of the combustion chamber, passes in a greater or lesser quantity through the pipe $i$ to the burner for use as a secondary air supply, whilst the remainder passes out through the opening at the upper end of the pipe $f$. This superfluous heated air can however be put to any desired use.

The flame formed in the inner space $m$ of the combustion chamber passes freely into the space $n$ and owing to the bending required to reach the space $n$ the flame drops ashes and fluid sediment on to the bottom $o$ of the combustion chamber, from whence these residues can be removed through the opening $x$.

If the space $n$ for the reception of the material to be heated is less in diameter than the space $m$ of the combustion chamber, the latter will, of course, be completely open to the space $n$.

Having now particularly described and ascertained the nature of our said invention and in what manner the same is to be performed, we declare that what we claim is:—

A furnace of the type described, embodying a vertical combustion chamber and a space to be heated completely open to the said combustion chamber, means for introducing pulverized fuel into the top of said combustion chamber, means for a primary supply of air into the furnace with the descending fuel, and means for a secondary supply of air, pre-heated, into the said chamber through the fuel inlet and with the primary supply of air, and means for regulating the supply of such pre-heated air, substantially as described.

In testimony whereof we affix our signatures.

ERICH VOGT.
LUDWIG KIRCHHOF.